July 1, 1958 F. A. GARRETT 2,841,010
METHOD OF SECURING THERMOMETER TUBES TO A BASE
Filed May 26, 1954
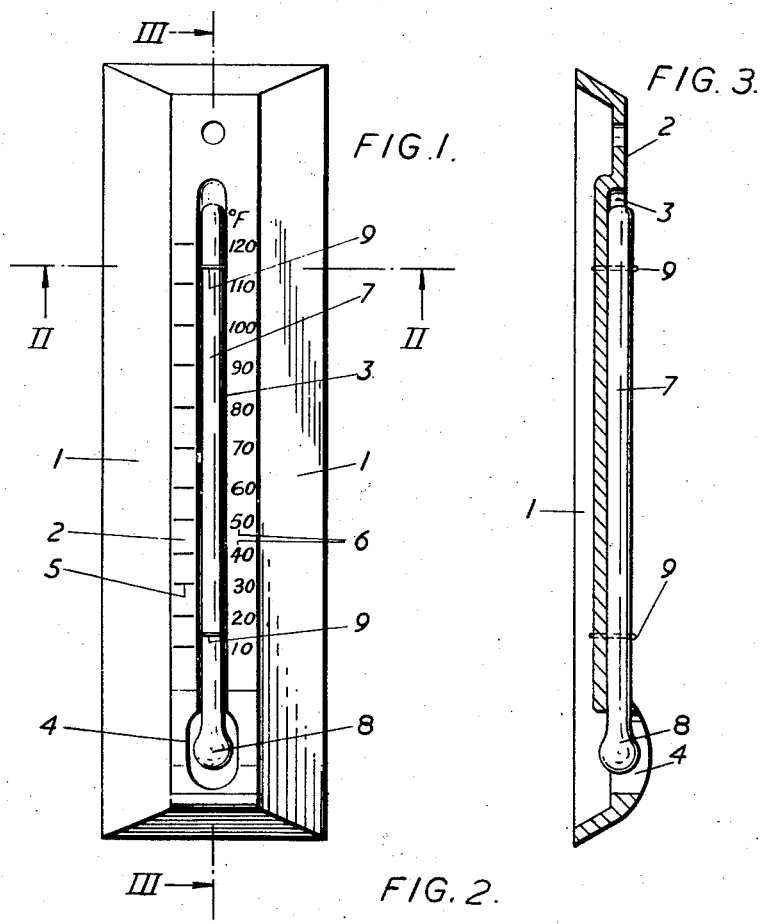
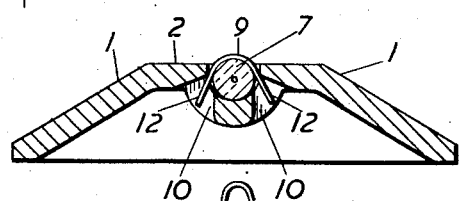
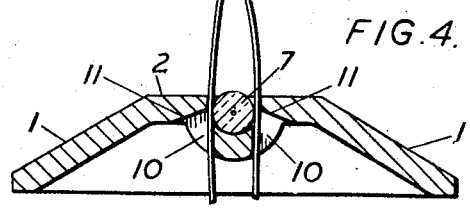
Inventor
F. A. GARRETT
By Emery L. Groff
Attorney

United States Patent Office 2,841,010
Patented July 1, 1958

2,841,010

METHOD OF SECURING THERMOMETER TUBES TO A BASE

Francis Alfred Garrett, Wentworth, Virginia Water, England

Application May 26, 1954, Serial No. 432,494

Claims priority, application Great Britain February 26, 1954

1 Claim. (Cl. 73—376)

This invention relates to mercury, spirit or the like thermometers and has for its object to provide a simplified and effective method of securing the thermometer proper in position on its base.

In connection with the mounting of glass thermometers on bases or supports, it is desirable for reasons of economy in manufacture to avoid the use of bulb stem retaining elements, such as straps, that require the use of screws to connect them to the base. It is also desirable to avoid the use of retaining clips of uniform, pre-formed construction since in the absence of uniformity in the external diameters of the bulb stems in a given batch of glass thermometers or owing to lengthwise variations in the external diameter of each thermometer stem, the pre-formed clips are frequently not effective to hold the thermometers firmly in position on their suppports or to prevent them from becoming loose.

The main object of the present invention is to provide a method of securing thermometer tubes to a base or support by drawing substantially U-shaped wires or other thin, wire-like elements or strips over the thermometer stem to firmly embrace the same and form limbs that engage with resilient pressure against abutments formed in the base, one at each side of the tube or stem.

In order that the nature of this invention may be more fully understood, reference will now be made to the accompanying drawings, in which:

Fig. 1 is a front elevation of one embodiment of thermometer with the glass thermometer proper held in place by retaining wires according to this invention.

Fig. 2 is a sectional elevation, on a much enlarged scale, the section being taken on the line II—II, Fig. 1.

Fig. 3 is a longitudinal section through the thermometer illustrated in Fig. 1, the section being taken on the line III—III, Fig. 1.

Fig. 4 is a view similar to Fig. 2 and illustrates an intermediate operation in the application of the retaining wires.

The invention is illustrated by way of example in connection with a thermometer base or support made by moulding from plastic material. The base comprises sloping sides 1 leading to a flat top 2 formed with a longitudinal groove or trough 3 having an enlarged lower end 4. A temperature scale comprising graduations 5 and temperature numerals 6 are provided on the top 2 at opposite sides of the groove 3. A glass thermometer of normal construction comprising a stem part 7 and a bulb part 8 is accommodated in the trough 3 and is retained in position by pairs of longitudinally spaced wire retaining elements 9.

The manner in which the retaining elements 9 retain each glass thermometer in position is clearly illustrated in Fig. 2 which shows a pair of apertures 10 in the thermometer base, one at each side of the thermometer stem 7. These apertures extend right through the base and communicate with the groove 3. The outer lateral walls 11 of the apertures are inclined upwardly towards each other and their upper edges constitute abutments for the straight limbs 12 of each wire retaining element. These limbs 12 are tangential to the curved portion of the wire element embracing the front of the stem 7.

The limbs 12 bear with resilient pressure against the abutments 11. The points of engagement between the limbs 12 and abutments 11 are disposed slightly above the centre of curvature of the bulb stem 7. As will be clear from Fig. 2, the limbs 12 define therebetween an acute angle of about 50°. It is preferred to employ hard stainless steel thin wire for the retaining elements 9, the wire being preferably of the order of 0.0148" diameter for a thermometer stem of a diameter between 3.5 to 4.5 mm. The inherent resilient qualities of this wire enable the straight limbs 12 to engage the abutments 11 with resilient pressure.

The manner of application of the wire retaining elements will now be described with reference to Fig. 4 which shows a piece of wire of hairpin shape partially inserted from the top of the thermometer base through the apertures 10. After the hairpin piece of wire is fully inserted so that the curved end thereof rests on the stem 7, one limb, for example the left hand limb of this piece of wire is pulled downwardly, as by pliers to thread the wire through the apertures 10. A part of the other limb thereupon becomes bent over and embraces the top of the thermometer stem 7 and portions of the limb adjacent the bend bear with resilient pressure against the abutments 11. It will be appreciated, therefore, that the retaining elements 9 are entirely formed from the straight part of the trailing limb of the hairpin-shaped wire pulled through the apertures 10. The surplus wire projecting from the rear ends of the apertures 10 is severed, as by means of pliers, as close as possible to the apertures.

This manner of applying the wire retaining elements may be simply and speedily performed by unskilled workers and results in each glass thermometer being firmly held in position in the groove 3. Owing to the small diameter wire employed, the elements 9 are comparatively inconspicuous from the front of the thermometer.

Before the wire retaining elements are applied, the glass thermometer is longitudinally adjusted so as to bring a positioning mark on the stem 7 opposite a given graduation 5, for example, that marked 60° in the case of a Fahrenheit scale. If desired, an additional anchoring of the thermometer proper may be achieved by applying adhesive to the base of the groove 3 so as to cement the stem 7 in position. The cement is, of course, applied before the wire retaining elements 9 are formed.

If desired, the longitudinal positioning of the stem 7 may be achieved by providing a recess in the base of the groove 3 near the upper end thereof, said groove being engaged by a projection or pip at the upper end of the stem 7, said pip being formed during sealing off of the upper end of the glass thermometer and extending at right angles to the axis thereof.

It is to be understood that the invention is not limited to the embodiment above described in which the base, the groove 3 and apertures 10 are formed by moulding from thermo-plastic or thermo-setting material; nor is the shape of the thermometer base of significance. The base may be made of any desired material and may, for instance, be in the form of a flat metal plate on which a thermometer stem is positioned between longitudinally spaced pairs of up-struck lugs serving the same function as the abutments 11. In the formation of the lugs, apertures are formed in the metal base for the passage of the straight limbs of the wire retaining elements which are applied in a similar manner to that hereinbefore described with reference to Fig. 4.

Wire or like retaining elements applied in the manner above described firmly hold the thermometer proper in position on the base and are effective irrespective of variations in the external diameters of the stems 7 as may occur either in a batch of glass thermometers or as may occur lengthwise of any particular thermometer stem. Despite the wastage of wire, the use of the retaining elements effects in large scale output a noticeable saving in costs.

What I claim is:

A method of firmly securing thermometer tubes on a base having a longitudinal groove and paired fastening receiving abutment forming openings which consists in applying said tube to the groove in the base, inserting substantially U-shaped wire loops about the tube through said fastening receiving openings whereby their limbs extend toward the rear face of the base, drawing one limb of the wire from behind the base to draw the wire through said apertures and causing the other limb to bend over and embrace the body of the thermometer stem, and simultaneously forming, by continued drawing of the first mentioned limb, splayed portions that bear with clamping pressure against the abutment sides of said openings to hold the tube to the base, and finally severing the excess wire of the drawn leg behind the base.

References Cited in the file of this patent

UNITED STATES PATENTS

| | | |
|---|---|---|
| 1,593,159 | Brush | July 20, 1926 |
| 1,605,236 | Hunter et al. | Nov. 2, 1926 |
| 1,942,506 | Bolton | Jan. 9, 1934 |
| 2,321,181 | Brown | June 8, 1943 |
| 2,598,169 | Hubbell | May 27, 1952 |

FOREIGN PATENTS

| | | |
|---|---|---|
| 485,462 | Great Britain | May 19, 1938 |